United States Patent
Lang et al.

(10) Patent No.: US 10,816,032 B2
(45) Date of Patent: Oct. 27, 2020

(54) SOCKET JOINT DEVICE, FASTENING DEVICE, AND INDIRECT VISUAL SYSTEM FOR VEHICLES

(71) Applicant: Mekra Lang GmbH & Co. KG, Ergersheim (DE)

(72) Inventors: Werner Lang, Ergersheim (DE); Georg Hecht, Weihenzell (DE)

(73) Assignee: MEKRA LANG GMBH & CO. KG, Ergersheim (DE)

( * ) Notice: Subject to any disclaimer, the term of this patent is extended or adjusted under 35 U.S.C. 154(b) by 447 days.

(21) Appl. No.: 15/843,565

(22) Filed: Dec. 15, 2017

(65) Prior Publication Data

US 2018/0172066 A1 Jun. 21, 2018

(30) Foreign Application Priority Data

Dec. 16, 2016 (DE) .......................... 10 2016 225 293

(51) Int. Cl.
*F16C 11/06* (2006.01)
*B60R 1/02* (2006.01)

(52) U.S. Cl.
CPC ............ *F16C 11/0623* (2013.01); *B60R 1/02* (2013.01); *F16C 11/0604* (2013.01);
(Continued)

(58) Field of Classification Search
CPC ..... B60R 1/02; B60R 1/04; B60R 1/06; F16C 11/0604; F16C 11/0623; F16C 11/0657;
(Continued)

(56) References Cited

U.S. PATENT DOCUMENTS 4,415,291 A * 11/1983 Smith ................. F16C 11/0604
403/138
4,915,493 A 4/1990 Fisher
(Continued)

FOREIGN PATENT DOCUMENTS

CN 1375416 A 10/2002
DE 2908675 A1 9/1980
(Continued)

OTHER PUBLICATIONS

Office Action issued by the Korean Intellectual Property Office for corresponding Korean Patent Application No. 10-2017-0173039 dated Jan. 7, 2019 (5 pages).
(Continued)

*Primary Examiner* — Josh Skroupa
(74) *Attorney, Agent, or Firm* — Dority & Manning, P.A.

(57) ABSTRACT

A socket joint device includes a first and a second joint component (2, 6). The first joint component (2) has a spherical surface element (10) with a convex or concave exterior (11). The exterior (11) of the spherical surface element (10) is part of a spherical surface. An engagement mechanism (14) engages over the spherical surface element (10), so that the engagement mechanism (14) and the spherical surface element (10) contact one another via a first contact surface (22). A spherical cap-shaped receptacle (24) in the first or second joint component (2, 6) and an associated convex spherical cap (26) in the respective other joint component result in a second contact surface (28) that has a smaller radius of curvature R2 than the radius of curvature R1 of the spherical surface element (10).

20 Claims, 5 Drawing Sheets

(52) U.S. Cl.
CPC ...... *F16C 11/0657* (2013.01); *F16C 11/0661* (2013.01); *F16C 2240/70* (2013.01); *Y10T 403/32647* (2015.01); *Y10T 403/32713* (2015.01)

(58) Field of Classification Search
CPC .............. F16C 11/0661; F16C 2240/70; F16C 2326/01; Y10T 403/32631; Y10T 403/32647; Y10T 403/32713
USPC .......................................... 403/122, 124, 132
See application file for complete search history.

(56) References Cited

U.S. PATENT DOCUMENTS

| | | | | |
|---|---|---|---|---|
| 5,897,417 | A * | 4/1999 | Grey | F16C 11/0604 403/340 |
| 6,877,709 | B2 * | 4/2005 | March | B60R 1/04 248/549 |
| 7,028,699 | B2 * | 4/2006 | Lee | A45B 17/00 403/122 |
| 8,864,155 | B2 * | 10/2014 | Kuroda | F16C 11/0638 403/122 |
| 2003/0086189 | A1 | 5/2003 | Tsuyama et al. | |
| 2006/0159375 | A1 * | 7/2006 | Krishnan | F16C 11/0604 384/192 |
| 2013/0121754 | A1 * | 5/2013 | Kuroda | F16C 11/0685 403/122 |
| 2015/0129738 | A1 | 5/2015 | Bögelein | |

FOREIGN PATENT DOCUMENTS

| | | | | |
|---|---|---|---|---|
| DE | 4224895 | A1 * | 2/1994 | .......... F16C 11/0604 |
| DE | 20305680 | U1 | 7/2003 | |
| DE | 102008026466 | A1 * | 12/2009 | .......... F16C 11/0604 |
| EP | 0705733 | B1 | 9/1997 | |
| EP | 2 484 559 | A1 | 8/2012 | |
| EP | 2484559 | A1 | 8/2012 | |
| FR | 3011295 | B1 * | 3/2016 | .......... F16C 11/0661 |
| GB | 2077347 | A * | 12/1981 | .......... F16C 11/0661 |
| JP | 2003312365 | A | 11/2003 | |
| JP | 5479159 | B2 | 4/2014 | |
| WO | WO 91/10933 | A1 | 7/1991 | |

OTHER PUBLICATIONS

European Search Report with English machine translation issued in corresponding German Application No. 17 205 917.2 dated May 3, 2018.

German Office Action with English translation issued in corresponding German Application No. 10 2016 225 293.3 dated Nov. 15, 2017.

Office Action issued by the CN Intellectual Property Office for corresponding CN Patent Application No. 201711282288.6 dated Dec. 10, 2019 (3 pages).

* cited by examiner

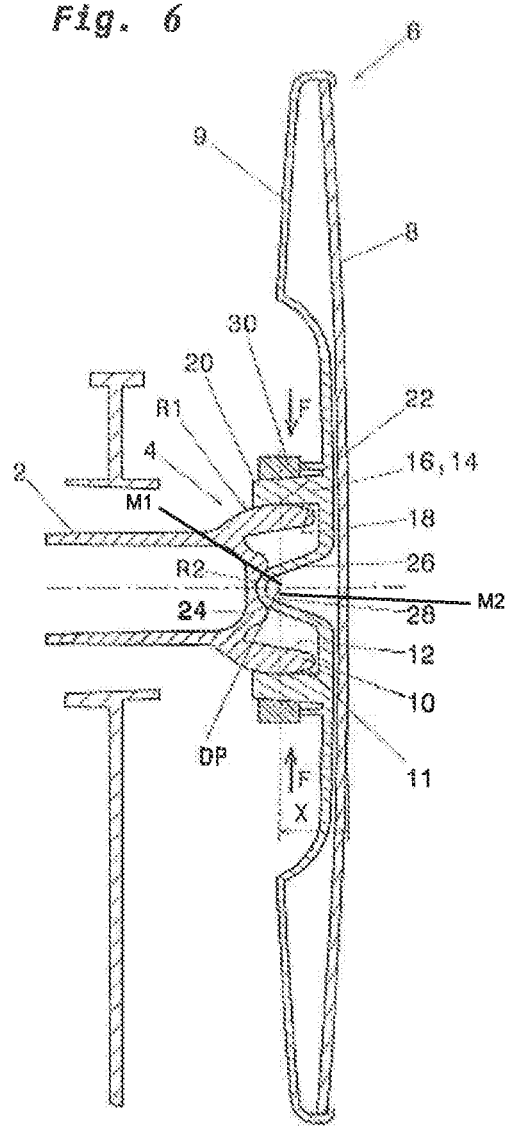

US 10,816,032 B2

SOCKET JOINT DEVICE, FASTENING DEVICE, AND INDIRECT VISUAL SYSTEM FOR VEHICLES

FOREIGN PRIORITY STATEMENT

The present application claims priority under 35 U.S.C. § 119 to German Patent Application No. 10 2016 225 293.3, filed on Dec. 16, 2016, and which is incorporated by reference in its entirety herein.

FIELD OF THE INVENTION

The invention relates to a socket joint or ball-and-socket device, a fastening device having such a socket joint device, and an indirect visual system having such a fastening device.

BACKGROUND OF THE INVENTION

FIG. 5 shows a known socket joint device, by means of which a mirror head 100 is adjustably mounted on a support arm 102. The mirror head has a mirror glass 104 and a mirror mounting plate 106. The support arm 102 on its end has a convex spherical ring-shaped section 108 that is overlapped by an engagement mechanism 110, having a complementary shape, on the mirror mounting plate 106. The engagement mechanism 110 is pressed against the spherical ring-shaped section 108 and secured by an annular spring 112. A disadvantage of this known socket joint device is that large effective supporting lengths or spherical surfaces are necessary for high adjustment torques, thus requiring a relatively large installation space and installation height. In many cases, this is not feasible from a design standpoint.

Document DE20305680U1 shows a socket joint arrangement with a cable tunnel inside having a plurality of first and second joint components. The first components comprise a spherical surface element having an exterior side being part of a spherical surface. A corresponding spherical surface element on the second joint components is in contact with the spherical surface element on the first joint components. Inside the first spherical element of the first joint components a convex knob is formed on the first joint components. This convex knob engages with concave receptacle extending from the second joint components connecting the first and second components like snapper fastener. The spherical surface element on the first joint components and the inside of the cup wall on the second joint components just overlap but do not provide a connection force between the first and second joint component. The connection between the first and second joint components is only achieved by the relative small snapper fastener connection inside the first joint components. Thus this socket joint is not suitable for carry heavy loads like rear view mirrors.

The object of the present invention, therefore, is to provide a socket joint device that has a low installation height and a fairly small installation volume and is nevertheless capable of transmitting large adjustment torques.

BRIEF DESCRIPTION OF THE INVENTION

This object is achieved by the features discussed herein.

The first joint component has a spherical surface element with a convex or concave exterior. The exterior of the spherical surface element is part of a spherical surface. An engagement mechanism engages over the spherical surface element, so that the engagement mechanism and the spherical surface element contact one another via a first contact surface. Since the engagement mechanism engages over the convex exterior side of the spherical surface element a snapper fastener like connection between the first and second joint component is provided. Since the spherical surface element or the convex exterior side of it is on outer side of the first joint component the snapper-fastener-like connection has large contact surfaces and thus provides a strong connection between the first and second joint component suitable for heavy loads. A spherical cap-shaped receptacle in the first or second joint component and an associated convex spherical cap in the respective other joint component result in a second contact surface that has a smaller radius of curvature R2 than the radius of curvature R1 of the spherical surface element. The first and second joint component support each other via concave, spherical cap-shaped receptacle and the convex spherical cap. Via two contact surfaces on the inside and the outside of the first joint component— the concave cap-shaped receptacle and corresponding convex cap inside and engagement mechanism and spherical surface element outside—high adjustment torques may be transmitted by the two contact surfaces in a fairly small installation space. Due to the double socket joint, it is possible despite the low installation height to realize a relatively large radius of the contact surfaces, and thus achieve a long effective supporting length of the contact surfaces. Large contact surfaces on a small installation space are made possible, as the result of which a high contact pressure may be achieved. For a flat second joint component, for example in the form of a mirror head, the pivot point of the socket joint may be situated closer to the mirror glass. No additional joining elements such as screws, locking bolts, or bayonet locks, etc., are necessary. The two joint components are joined together via a detachable snap connection, thus reducing costs.

According to one preferred embodiment, the concave, spherical cup-shaped receptacle has depth equal or smaller than the radius of sphere forming the basis of the concave spherical cap-shaped receptacle, such that the convex spherical cap is just supported in the of concave spherical cap-shaped receptacle.

According to one preferred embodiment, the concave spherical cap has a shape that is complementary to the convex spherical cap-shaped receptacle, resulting in a large spherical cap-shaped second contact and support surface.

According to a preferred embodiment, not only does the engagement mechanism enclose the spherical surface element, but in addition the engagement mechanism has a shape that is complementary to the exterior of the spherical surface element. As a result, the first contact surface is enlarged, and higher adjustment torques may be transmitted. Thus the socket joint can carry larger loads.

According to an advantageous embodiment, the midpoints M1 and M2 of the radii of curvature R1 and R2, respectively, are not identical, but instead differ from one another in the one-tenth millimeter range. This results in pretensioning in the connection of the two joint components.

According to an advantageous embodiment, the elastic design of the spherical surface element and/or of the engagement mechanism simplifies the installation of the two joint components next to one another.

According to an advantageous embodiment, the cohesion is improved by a spring element, in particular an annular spring, which presses the engagement mechanism against the spherical surface element.

According to an advantageous embodiment, the exterior of the spherical surface element is concave. This simplifies installation, since the first joint component having the spherical surface element is made of a stiffer or harder material than the second joint component.

Larger adjustment angles between the first and second joint components are possible due to advantageous embodiments, with an element that has a spherical ring shape in sections.

The socket joint device according to the invention is advantageously used for connecting indirect vision devices to a vehicle. These devices may be monitors, conventional mirrors, camera systems, sensor units, or display units, or complete mirror substitute systems.

BRIEF DESCRIPTION OF THE DRAWINGS

Further particulars, features, and advantages of the invention result from the following description of preferred embodiments, with reference to the drawings, which show the following:

FIG. 6 shows an embodiment having a double socket joint in pretensioning during installation.

DETAILED DESCRIPTION OF THE INVENTION

Figure 1:
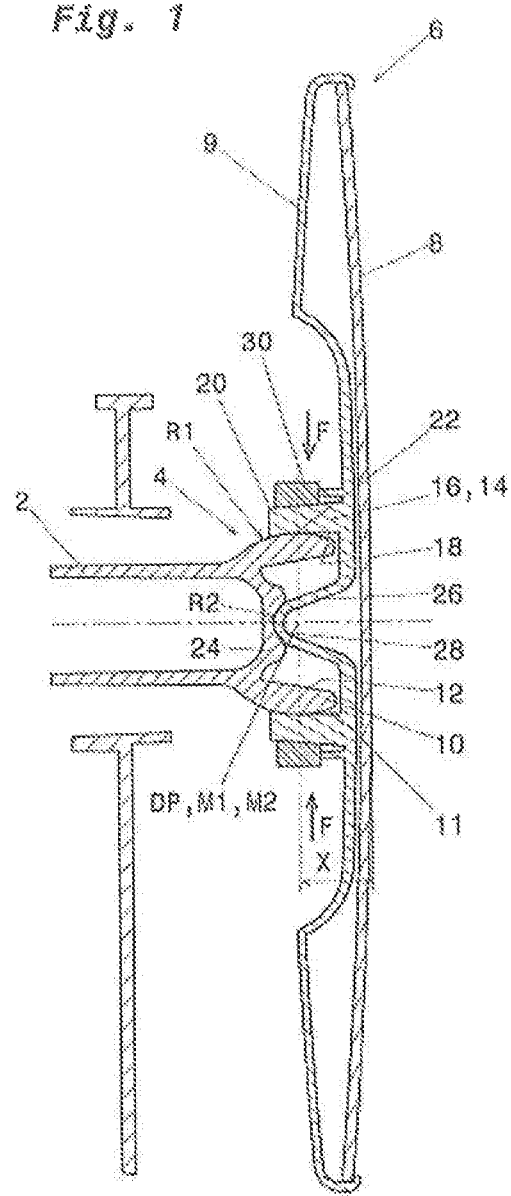
FIG. 1 shows a first embodiment of the invention.

The embodiment according to FIG. 1 shows a first joint component 2 in the form of a support arm, to which a second joint component 6 in the form of a mirror head is adjustably fastened via a double socket joint 4. The mirror head 6 has a mirror glass 8 and a mirror mounting plate 9. The support arm 2 on one end has a toric and spherical ring-shaped spherical surface element 10 having a convex, spherical ring-shaped exterior side 11 and a tubular interior side 12. An engagement mechanism 14 on the mirror mounting plate 9 engages over the convex exterior side 11 of the spherical surface element 10. In other words the engagement mechanism 14 engages the convex exterior side 11 beyond it largest diameter. Accordingly a snapper fastener like connection the first and second joint components 2, 6 is provided. The convex exterior side 11 of the spherical surface element 10 has a first radius of curvature R1 about a first midpoint M1. The engagement mechanism 14 has a cup-shaped design, and has a cup wall 16 with an inner side 18 and an outer side 20. The inner side 18 of the cup wall 16 is rounded at least in the top area, so that a first contact surface 22 is formed between the convex exterior side 11 of the spherical surface element 10 and the inner side 18 of the cup wall 16.

Provided inside the spherical ring-shaped spherical surface element 10 is a concave, dome or cup-shaped receptacle 24 having a second radius of curvature R2 about a second midpoint M2. The tubular interior side 12 and the receptacle 24 define a cup shaped interior. A convex spherical cap 26 extends centrally from the mirror mounting plate 9 of the mirror head 6 into the cup-shaped interior of the first joint component 2, and is supported on the spherical cap-shaped receptacle 24. A spherical cap-shaped, second contact surface 28 is thus formed. On the outer side 20 of the cup wall 16, an annular spring 30 encloses the cup wall 16 of the engagement mechanism 14 and presses the inner side 18 of the cup wall 16 against the exterior 11 of the spherical ring-shaped spherical surface element 10. Since in the double socket joint 4 the adjustment torques are transmitted via the first contact surface 22 and also via the second contact surface 28, a smaller design is possible, so that the pivot point DP of the double socket joint 4 is situated closer to the mirror glass 8 of the mirror head 6; i.e., the distance X between the mirror glass 8 and the pivot point becomes smaller.

In the embodiment according to FIG. 1, the pivot point DP coincides with the two midpoints M1 and M2 of the two radii of curvature R1 and R2, respectively. Alternatively, as illustrated in FIG. 6, the two midpoints M1 and M2 may be offset relative to one another in the one-tenth millimeter range, so that the pivot point DP of the double socket joint 4 is situated between the two midpoints M1 and M2. The double socket joint is thus under pretensioning during the installation, thereby avoiding play.

Figure 2:
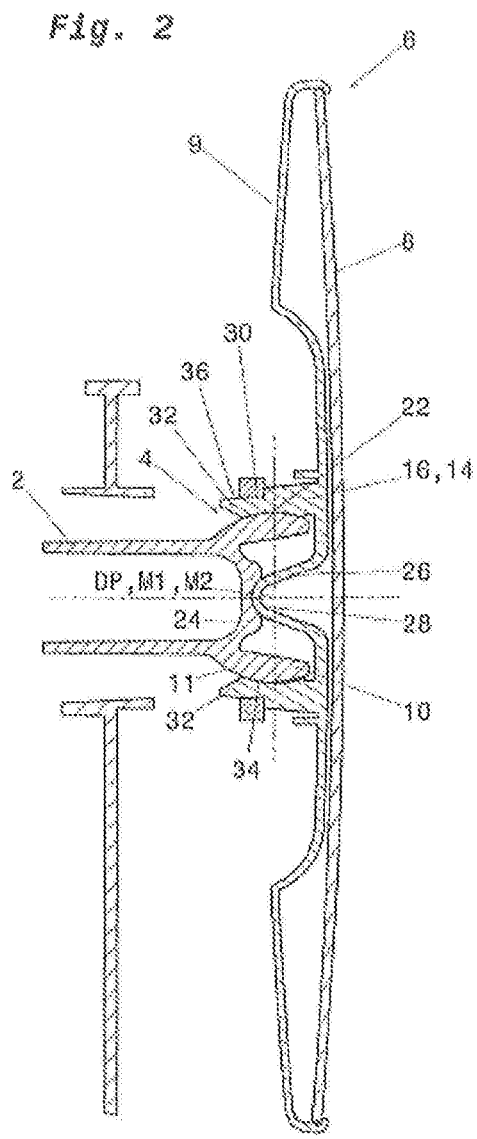
FIG. 2 shows a second embodiment of the invention.

FIG. 2 shows a second embodiment of the invention, which differs from the first embodiment according to FIG. 1 solely in the design of the engagement mechanism 14. Instead of the cup-shaped design, the engagement mechanism 14 includes a plurality of circularly distributed snap hooks 32 having a front or contact side 34 and a rear side 36. The snap hooks 32 with their contact side 34 engage over the convex exterior 11 of the spherical ring-shaped surface element 10 providing a snapper fastener like connection. The contact sides 34 of the snap hooks 32 facing the convex exterior 11 of the spherical ring-shaped spherical surface element 10 have a rounded shape that is complementary to the shape of the convex exterior 11 of the spherical ring-shaped spherical surface element 10, resulting in a spherical strip-shaped first contact surface 22 between the engagement mechanism 14 and the spherical ring-shaped spherical surface element 10. A first contact surface 22 that is larger than the embodiment according to FIG. 1 results due to the complementary shapes of the spherical surface element 10 and the contact side 34 of the snap hooks 32. The remaining design of the second embodiment corresponds to the design of the first embodiment according to FIG. 1.

Figure 3:
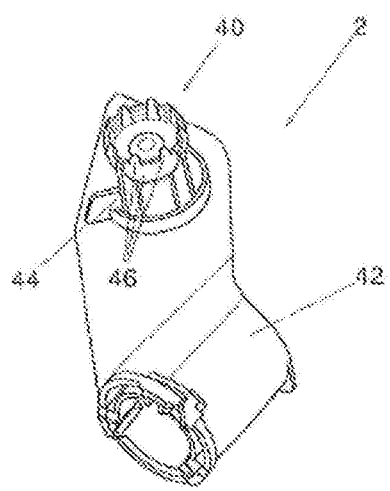
FIG. 3 shows a perspective illustration of a second joint component as the carrier of an additional component.

FIG. 3 shows a perspective illustration of a second embodiment of the first joint component 2, having a spherical surface element 40, with a spherical ring shape in sections, at one end, and a detent element 42 at the other end, of the first joint component 2. The spherical surface element 40 with a spherical ring shape in sections has multiple spherical ring-shaped sections 44 distributed over the circumference, from which in each case two pins 46 extend, and whose exteriors 11 rest on the spherical surface spanned by the spherical ring-shaped sections 44.

Figure 4:
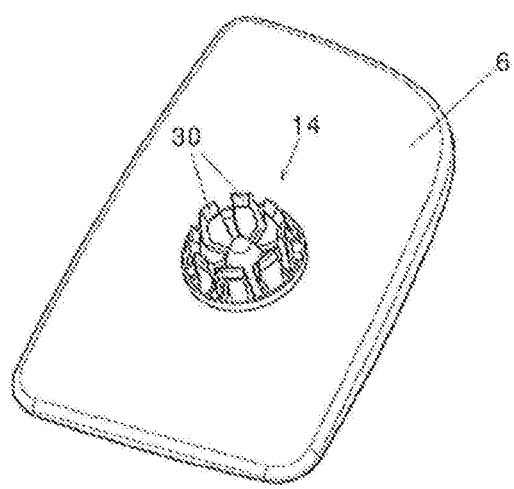
FIG. 4 shows a second joint component in the form of a mirror head.
Figure 5:
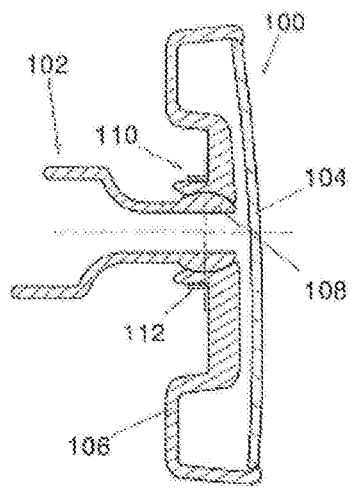
FIG. 5 shows a mirror together with a socket joint device according to the prior art.

FIG. 4 shows a perspective illustration of the mirror head 6 according to FIG. 2, together with the engagement mechanism 14 having the circularly distributed snap hooks 32.

The two joint components 2 and 6 may be made of plastic or metal. The first joint component 2 is typically made of metal or hard plastic, and the second joint component is made of fairly soft plastic.

The described exemplary embodiments show double socket joints 4 with manual adjustment. The double socket joints may also be adjusted by motor.

LIST OF REFERENCE SYMBOLS

DP pivot point of the double socket joint
R1 first radius of curvature
M1 first midpoint
R2 second radius of curvature M2 second midpoint
X distance between DP and mirror glass
2 first joint component, support arm
4 double socket joint
6 second joint component, mirror head
8 mirror glass
9 mirror mounting plate
10 spherical surface element
11 convex exterior of 10
12 tubular interior of 10
14 engagement mechanism
16 cup wall of 14
18 inner side of 16
20 outer side of 16
22 first contact surface
24 concave, spherical cap-shaped receptacle
26 convex spherical cap
28 second contact surface
30 annular spring
32 snap hook
34 front or contact side of 32
36 rear side of 32
40 spherical surface element having a spherical ring shape in sections
42 tubular detent element
44 spherical ring-shaped sections
46 pin on 44
100 mirror head
102 support arm
104 mirror glass
106 mirror mounting plate
108 convex spherical ring-shaped section
110 engagement mechanism having a complementary shape
112 annular spring

The invention claimed is:

1. A socket joint device for adjustably mounting a first and a second joint component about a pivot point, comprising:
a spherical surface element to be mounted on the first joint component, with an exterior that is part of a spherical surface and has a first radius of curvature with a first midpoint,
an engagement mechanism to be mounted on the second joint component, which contacts the spherical surface element with a first contact surface,
a concave spherical cap-shaped receptacle which is situated inside the spherical surface element at the first or second joint component, the concave spherical cap-shaped receptacle having a second radius of curvature with a second midpoint,
wherein the second or first joint component has a convex spherical cap, which with a second contact surface is supported in the spherical cap-shaped receptacle, and
wherein the first radius of curvature is larger than the second radius of curvature,
wherein the engagement mechanism engages over the spherical surface element and connects the first and second joint component like a snap fastener, and
wherein the spherical surface element has a spherical ring shape in sections distributed over a circumference of the spherical surface element, the sections of the spherical surface element being spaced apart along a circumferential direction.

2. The socket joint device according to claim 1, wherein the concave spherical cap-shaped receptacle at the first or second joint component has a depths equal or smaller than the radius of sphere forming the basis of concave spherical cap-shaped receptacle, such that the convex spherical cap is just supported in the of concave spherical cap-shaped receptacle.

3. The socket joint device according to claim 1, wherein the convex spherical cap has a shape that is complementary to the concave spherical cap-shaped receptacle.

4. The socket joint device according to claim 1, wherein the engagement mechanism to be mounted on the second joint component has a shape that is complementary to the spherical surface element of the first joint component.

5. The socket joint device according to claim 1, wherein the first and second midpoints are slightly offset relative to one another, thus joining the two joint components together under pretensioning.

6. The socket joint device according to claim 1, wherein the spherical surface element to be mounted on the first joint component is elastic and presses the engagement mechanism against the second joint component.

7. The socket joint device according to claim 1, wherein the engagement mechanism to be mounted on the second joint component is elastic and presses against the spherical surface element to be mounted on the first joint component.

8. The socket joint device according to claim 1, further comprising a spring element that presses the engagement mechanism to be mounted on the second joint component against the spherical surface element on the first joint component.

9. The socket joint device according to claim 8, wherein the spring element is an annular spring.

10. The socket joint device according to claim 1, wherein the spherical surface element to be mounted on the first joint component has a convex exterior side.

11. The socket joint device according to claim 1, wherein the spherical surface element has pins that extend from the spherical ring-shaped sections, and whose exteriors rest on the spherical surface spanned by the spherical ring-shaped sections.

12. A fastening device for mounting an indirect visual system or components of an indirect visual system on or in a vehicle, having at least one component on the vehicle side and at least one component on the visual system side, the components being joined together via at least one socket joint device according to claim 1.

13. A socket joint device for adjustably mounting a first and a second joint component about a pivot point, comprising:
a spherical surface element to be mounted on the first joint component, with an exterior that is part of a spherical surface and has a first radius of curvature with a first midpoint,
an engagement mechanism to be mounted on the second joint component, which contacts the spherical surface element with a first contact surface,
a concave spherical cap-shaped receptacle which is situated inside the spherical surface element at the first or second joint component, the concave spherical cap-shaped receptacle having a second radius of curvature with a second midpoint,
wherein the second or first joint component has a convex spherical cap, which with a second contact surface is supported in the spherical cap-shaped receptacle, and
wherein the first radius of curvature is larger than the second radius of curvature,
wherein the engagement mechanism engages over the spherical surface element and connects the first and second joint component like a snap fastener, wherein the first and second midpoints are slightly offset relative to one another, thus joining the two joint components together under pretensioning.

14. The socket joint device according to claim 13, wherein the spherical surface element to be mounted on the first joint component is elastic and presses the engagement mechanism against the second joint component.

15. The socket joint device according to claim 13, wherein the engagement mechanism to be mounted on the second joint component is elastic and presses against the spherical surface element to be mounted on the first joint component.

16. The socket joint device according to claim 13, further comprising a spring element that presses the engagement mechanism to be mounted on the second joint component against the spherical surface element on the first joint component, wherein the spring element is an annular spring.

17. The socket joint device according to claim 13, wherein the spherical surface element to be mounted on the first joint component has a convex exterior side.

18. The socket joint device according to claim 13, wherein the spherical surface element has a spherical ring shape, at least in sections.

19. A fastening device for mounting an indirect visual system or components of an indirect visual system on or in a vehicle, having at least one component on the vehicle side and at least one component on the visual system side, the components being joined together via at least one socket joint device according to claim 13.

20. A socket joint device for adjustably mounting a first and a second joint component about a pivot point, comprising:
- a spherical surface element to be mounted on the first joint component, with an exterior that is part of a spherical surface and has a first radius of curvature with a first midpoint,
- an engagement mechanism to be mounted on the second joint component, which contacts the spherical surface element with a first contact surface,
- a concave spherical cap-shaped receptacle which is situated inside the spherical surface element at the first or second joint component, the concave spherical cap-shaped receptacle having a second radius of curvature with a second midpoint,
- wherein the second or first joint component has a convex spherical cap, which with a second contact surface is supported in the spherical cap-shaped receptacle, and
- wherein the first radius of curvature is larger than the second radius of curvature,
- wherein the engagement mechanism engages over the spherical surface element and connects the first and second joint component like a snap fastener,
- wherein the spherical surface element has a spherical ring shape in sections distributed over a circumference of the spherical surface element, and
- wherein the spherical surface element has pins that extend from the spherical ring-shaped sections, and whose exteriors rest on the spherical ring-shaped sections.

* * * * *